(12) United States Patent
Priore

(10) Patent No.: US 11,116,194 B2
(45) Date of Patent: Sep. 14, 2021

(54) FISHING LURE WITH HIGHLY ACTIVE PROPELLER

(71) Applicant: Rocco Nicola Priore, Zephyr (CA)

(72) Inventor: Rocco Nicola Priore, Zephyr (CA)

( * ) Notice: Subject to any disclaimer, the term of this patent is extended or adjusted under 35 U.S.C. 154(b) by 243 days.

(21) Appl. No.: 16/510,430

(22) Filed: Jul. 12, 2019

(65) Prior Publication Data

US 2021/0007338 A1  Jan. 14, 2021

(51) Int. Cl.
*A01K 85/16* (2006.01)

(52) U.S. Cl.
CPC .................... *A01K 85/16* (2013.01)

(58) Field of Classification Search
CPC ........ A01K 85/10; A01K 85/12; A01K 85/16; A01K 85/18
USPC ......................................................... 43/42.2
See application file for complete search history.

(56) References Cited

U.S. PATENT DOCUMENTS

| | | | | |
|---|---|---|---|---|
| 2,429,568 A * | 10/1947 | Stevermer | ............... | A01K 85/10 43/42.17 |
| 2,472,505 A * | 6/1949 | Yocam | .................... | A01K 85/16 43/26.2 |
| 2,472,639 A * | 6/1949 | Wickens | ................ | A01K 85/18 43/42.03 |
| 2,501,103 A * | 3/1950 | Slater | ...................... | A01K 85/12 43/42.15 |
| 2,955,375 A * | 10/1960 | Mitchell | ................ | A01K 85/16 43/17.6 |
| 3,521,394 A * | 7/1970 | Wintersberger | ....... | A01K 85/16 43/42.06 |
| 3,757,454 A * | 9/1973 | Shurley | .................. | A01K 85/16 43/42.16 |
| 3,831,312 A * | 8/1974 | Pope | ...................... | A01K 85/12 43/42.17 |
| 6,000,165 A * | 12/1999 | Van Iseghem, Jr. | ... | A01K 85/16 43/26.2 |
| 6,640,485 B1 * | 11/2003 | Dykema | ................ | A01K 85/16 43/42.11 |
| 2002/0040545 A1 * | 4/2002 | Sabine | ................... | A01K 85/12 43/42.21 |
| 2006/0201050 A1 * | 9/2006 | Troutman | .............. | A01K 85/12 43/42.19 |

(Continued)

FOREIGN PATENT DOCUMENTS

| | | | | |
|---|---|---|---|---|
| CA | 2256832 A1 * | 6/2000 | ............. | A01K 85/18 |
| CH | 626503 A5 * | 11/1981 | ............. | A01K 85/12 |

(Continued)

*Primary Examiner* — Christopher P Ellis
(74) *Attorney, Agent, or Firm* — Nasser Ashgriz; UIPatent Inc.

(57) ABSTRACT

The present invention is a fishing lure comprising of two tail fins and a vertical axis propeller positioned vertically in between the two tail fins. This design causes that the lure go through a type of produce more water spray and to be more attractive in the water. The body of the lure may also comprise of several movable portions, which when combined with the movement of the propeller result in a life like fish movement to better attract fish. The vertical axis propeller is mounted on a rod between the tail fins and can be rotate freely and easily upon said rod member by the stream of water. Motion is imparted to the propeller by the action of the water as the lure is drawn by the fisherman through the water.

11 Claims, 8 Drawing Sheets

(56) References Cited

U.S. PATENT DOCUMENTS

| | | | | |
|---|---|---|---|---|
| 2009/0126256 | A1* | 5/2009 | Gregory | A01K 85/00 43/42.09 |
| 2011/0010984 | A1* | 1/2011 | Reynolds | A01K 85/01 43/42.47 |
| 2012/0036759 | A1* | 2/2012 | Salovirta | A01K 85/12 43/42.2 |
| 2012/0096757 | A1* | 4/2012 | Langer | A01K 85/18 43/42.24 |
| 2014/0325890 | A1* | 11/2014 | Chennaz | A01K 85/01 43/42.06 |
| 2018/0070568 | A1* | 3/2018 | Ciacchi | A01K 85/02 |
| 2018/0360012 | A1* | 12/2018 | Ruboyianes | A01K 85/12 |

FOREIGN PATENT DOCUMENTS

| | | | | | |
|---|---|---|---|---|---|
| EP | 2989895 | A1 | * | 3/2016 | A01K 85/12 |
| FR | 2773670 | A1 | * | 7/1999 | A01K 85/02 |
| GB | 2307837 | A | * | 6/1997 | A01K 85/16 |

\* cited by examiner

FISHING LURE WITH HIGHLY ACTIVE PROPELLER

FIELD OF THE INVENTION

The present invention relates in general to fishing lures and in particular to a fishing lure with a vertical axis propeller, which effectively and efficiently simulates lifelike motion to bait a fish.

BACKGROUND OF THE INVENTION

Fishing lures are commonly used in fishing. Artificial fish lures are known to be more effective when they simulate the motion of a live bait, in particular when the lure is placed in a water current, or as the lure is drawn through water while trolling or when retrieving from a cast.

Numerous fish lures are invented to achieve a live bait motion. For example, fish lures with propellers or rotatable wheel members disposed on axles extending laterally from the body of the lure are disclosed to mimic movement of fish tail and fins. Various shapes of propellers are used depending on several factors. One factor is the speed of retrieval of the lure. The speed of retrieval dictates the revolving speed of a propeller with a particular blade design. Therefore, propellers with different blade designs are provided for different speed of retrieval.

Many of the prior art lures, however, undergo such erratic movements that the simulation of lifelike movement is not attained. On the other hand, many of the other prior art lures do not produce a sufficient amount of vibration and lifelike movement. A problem that frequently arises with the prior art lures, which are intended to simulate lifelike motion, is that the motion of the lure twists the line to which the lure is connected, causing it to foul.

Another drawback with the prior art fish lures is that the propeller itself impedes its own rotation by interfering with the water as it attempts to rotate as a consequence of interaction between the blades and the water. The propeller thus accelerates slowly and has a relatively low ratio of rotary speed to speed of translation through the water as it is being towed by the fish line. Additionally, the amount of activity which can be created with short pulls on the line is very limited.

The other drawback with the prior art lures with propellers is that since these propellers are essentially a flat piece of blades that are horizontally attached to the body of the lure, when they come in contact with an underwater obstruction, tend to stop, and then, when stopped, tend to drop in the water.

Therefore, it is desirable to provide a fishing lure, which produces more vibration with a single propeller to attract fish compared to the prior art fishing lures.

SUMMARY OF THE INVENTION

The present invention is a fishing lure in a tubular configuration, like a body of a fish, which has a vertical axis propeller positioned vertically at the end portion of the body to enhance the vibration of the fish lure, thereby causing the lure to produce more water movement or spray, and to be more attractive to a fish.

The vertical axis propeller is mounted on a bar between the tail fins, which can rotate freely and easily around the bar by the stream of water. The blades of the vertical axis propeller are of such length that they extend from one fin of the fish tail to the second fin. The blades of the vertical axis propeller are mounted in a vertical position and have a set of blades, each blade is circularly curved along a width of the blade, whereby when the lure is moved through water, a flow of water passing over the vertical axis propeller causes rotation of the blades on the bar.

A motion is imparted to the propeller by the action of the water as the lure is drawn by a fisherman through the water. The action is related to forcing water towards the lure in the opposite direction to its motion through the water and cause the rotation of the vertical axis propeller.

The direction of rotation of the propeller is opposite to the direction of water stream in a vertical axis. Therefore, when the line is pulled through the water, it produces a stronger turbulence, thereby producing a more natural movement like a live fish. The blades of this propeller provide a strong propulsion compared to other propellers to facilitate the lure to attract a fish. This action further provides the lure a higher speed when passing over aquatic vegetation and other obstructions that may be in its path, and thus prevent the hooks from being snagged or damaged.

In the preferred embodiment, an interior channel is formed in the body of the lure. The interior channel has a front opening for admitting water into the interior channel of the lure and through the lure and out through the rear opening. The channel is connected from front opening to the rear opening and may have an angle with respect to the longitudinal axis of the lure.

The vertical axis propeller is mounted at the rear of the lure body in front of the rear opening to deliver the most water current to the propeller. As would be known to those skilled in the art, the shape of the openings and the pattern formed by the openings may be varied. In addition, the configuration of the front opening of the lure to the water, may be varied to control the amount of water entering the lure or the way the force of the water on the lure affects and the movement of the lure and controls the dynamics of the water flow and expelled from the rear of the lure, as well as the rotation of the propeller under the force of the water.

The fishing lure includes a connector for connecting the body to a fish line, for trolling or retrieving, and to move the fish lure through the water, whereby the lure dives to force water to rotate the vertical axis propeller or to flow water into and through the interior channel and to force water to move the propeller. Any suitable connector may be selected to connect the lure to the fishing line.

Therefore, it is an object of the present invention to provide a fishing lure having a vertical axis propeller, which provides a strong vibration and produce more water spray while the lure is pulled, to better mimic a live fish.

It is another object of the present invention to provide a propeller, which is less disposed to be knotted in weeds within the water and being stopped by the obstruction, and thereby drop in the water.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
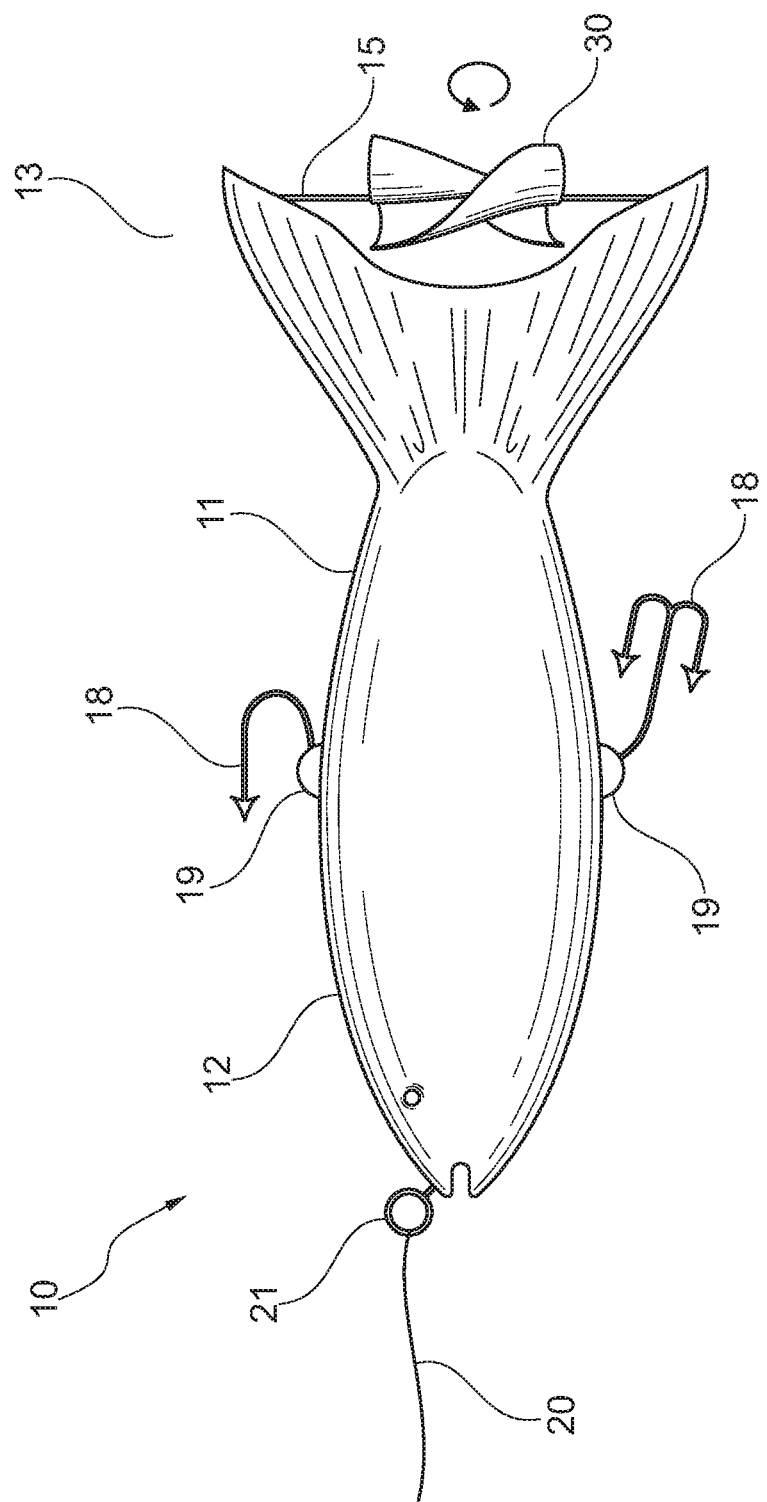
FIG. 1 is a side view of the present invention.

FIG. 1 shows the fishing lure 10 according to the disclosed inventive principles of the present invention, however, as would be known and understood by those skilled in the art, the configuration of the fishing lure 10 may be any geometric shape, without departing from the disclosed inventive principles. The body of the fishing lure 11 can be in various configuration, which in this embodiment represent an artificial fish like shape. The fishing lure 10 has a head 12 and a tail 13.

The head of the lure 12 has a suitable attaching means such as an eye ring 21 to attach the lure to a fishing line 20 for trolling or retrieving, and to move the fishing lure 10 through the water. Any attaching means such as snaps with twisting connection for a simple and fast attaching may be provided on the fishing lure 10. The fishing lure 10 may be made of any suitable material or composition such as wood, plastic, rubber, metal, cork, and other suitable materials.

The fish tail 13 comprises of a pair of fish fins connected to each other by a retaining bar 15 for receiving a vertical axis propeller 30. The vertical axis propeller 30 is disposed vertically in the opening space between the fish fins of the tail 13.

In one embodiment of the present lure, the blades of the vertical axis propeller 30 are curved to capture more water and are mounted vertically on the retaining bar 15 and rotate in an axle in a vertical manner to provide a vibration in the water. The retaining bar 15 can be fixed on the fishing lure 10 or can be detachable to permit changing the vertical axis propeller 30 as desired and permit the fisherman to change and use various vertical axis propellers 30 with each fishing lure 10.

Vertical axis propellers provide a high trust, by ejecting captured water at high speed. Therefore, when the lure is being pulled through water, small deviations in the direction of pulling the lure, results in a large change in the direction of motion of the lure. This results in a larger lateral vibration of the lure, making the lure more attractive to a fish. Generally, the vertical axis propeller provides a better maneuverability and steering of the lure. This type of propeller, develops the forces which are not centered compared to lure horizontal axis (and formation of so called parasite moments). The propeller tends to turn the lure in circles, whereas the lure is being pulled in one direction. Therefore, the lure will go through a zig-zag motion, making the lure attractive to a fish.

The vertical axis propeller blades 30 extending vertically from the top fin to the bottom fin of the lure 10. The width of the blades is determined to provide sufficient amount of propeller and water movement for a realistic fish movement. The blades are curved to capture more water. The water that is ejected out of the fishing lure is captured by the curved blades providing converting the water momentum to lure propulsion.

It is to be noted that when the fishing lure 10 falls through the water and the line 20 is pulled by the angler, the force of water rotates the propeller 30, and therefore, tends to move the lure in a circular motion. However, since the lure 10 is being pulled as well as being rotated by the propellers, the lure goes through jerking motion, resulting in a significant water disturbance.

Figure 2A:
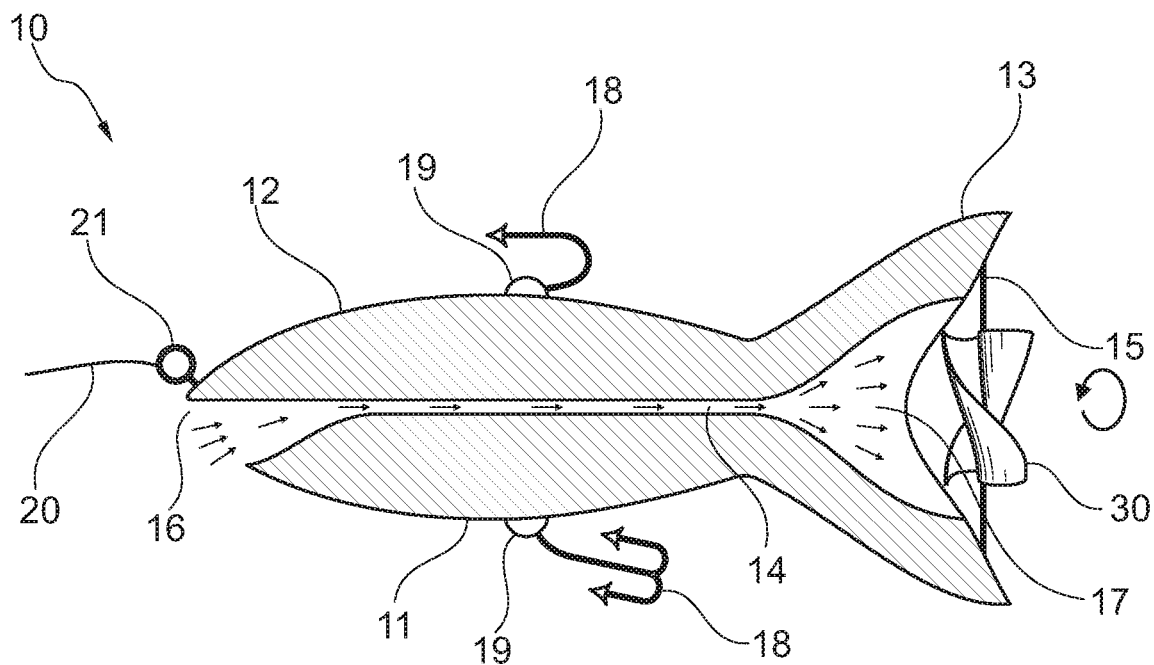
FIG. 2A is a longitudinal cross-section through the lure of another embodiment of the present invention.
Figure 2B:
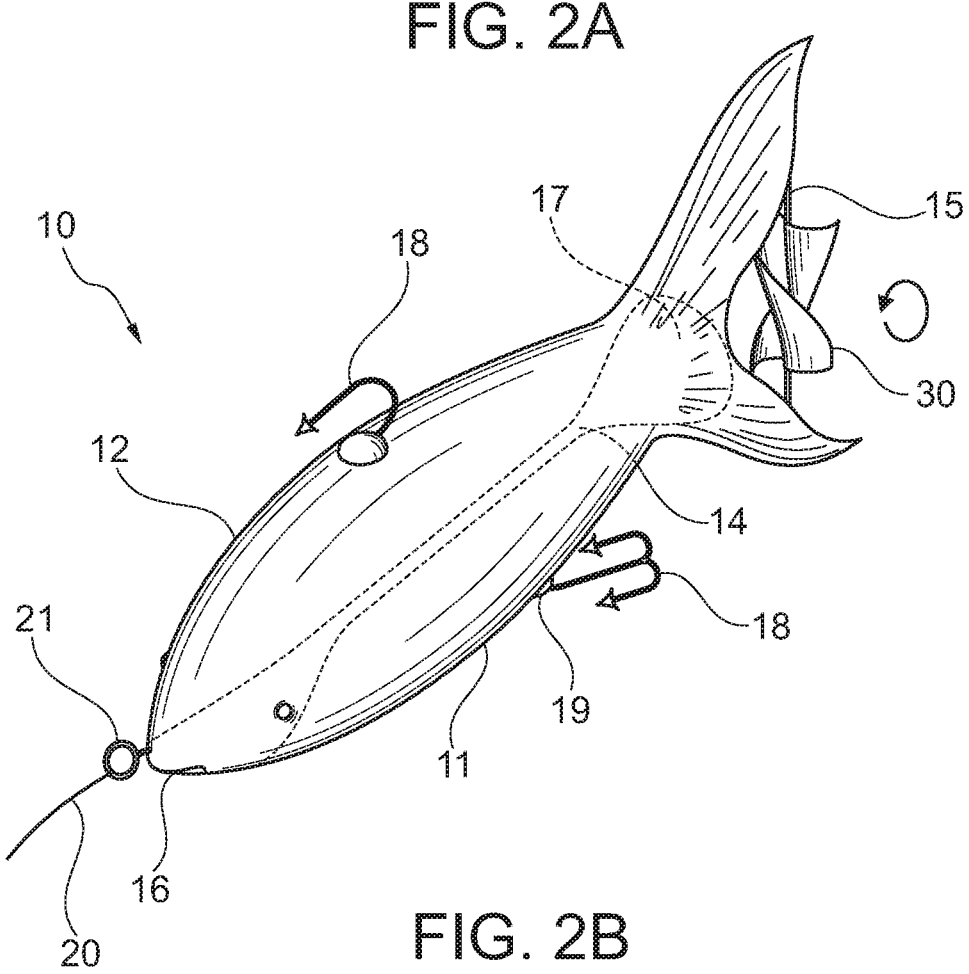
FIG. 2B is a perspective view of the same embodiment of the fishing lure according to FIG. 2A.
Figure 2C:
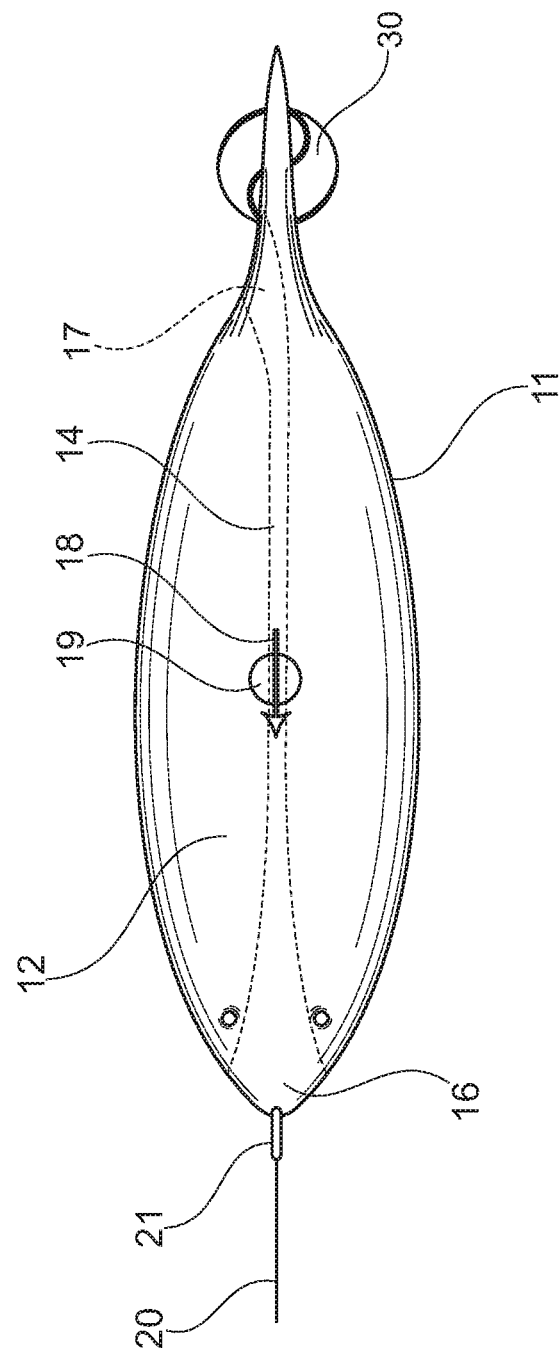
FIG. 2C is a top view of the same embodiment of the fishing lure according to FIG. 2A.

In another embodiment of the same invention, as shown in FIGS. 2A, 2B, and 2C according to the disclosed inventive principles, the fishing lure 10 provides a front opening 16 communicating with a rear opening 17 through an interior channel 14. The channel 14 is an elongated longitudinally disposed channel 14 designed to smoothly convert the conical front opening 16 to the vertically oriented rectangular shape rear opening 17.

The channel 14 is so designed to have a large opening in front of the channel 16 to capture as much water as possible. The rear opening 17 is in front of the propeller 30 to direct water to the propeller. The cylindrical shape of the channel 14 and the rectangular shape rear opening 17 is directly in front of the vertical axis propeller 30. The front opening channel 16 is a conical shape opening to maximize water capture as is the lure 10 is moved through the water. The rear opening of the channel 17 is a vertically oriented rectangular shape opening to orient the water ejections from the rear opening 17 along the vertical axis propeller 30 and to maximize the water speed capture as it is ejected from the rear opening 17. The channel 14 can also be constructed off of the vertical axis of the bar 15 so the water flow is directed towards one side of the blades of the vertical axis propeller 30. The blades of the vertical axis propeller 30 are circularly curved along a width of the blade to maximize the water capture.

In one embodiment as shown in FIG. 2C the rectangular section exit opening 17 of the inner channel is slightly shifted to one side to cause the propeller 30 rotation always in one direction. The shift can be to the right or to the left side.

The purpose of the channel 14 is to directing water against the blades of the propeller 30. By trolling or retrieving the fish lure 10 through the water, the body of the lure 11 dives to force water to flow into and through the interior channel 14 and trap water in the interior channel 14 and to force the trapped water through the rear opening 17 into the propeller 30 and make the propeller 30 to rotate thereby, the water force on the propeller 30 will be not only from the sides of the propeller 30 but also directly from the rear opening 17 of the channel 14 to the blades of the propeller 30 creating a double water vibration. In the Construction of the fishing lure 10, the channel 14 may be at an Acute angle relative to the longitudinal body.

As the fisherman pulls the angle the water will be driven into the channel 14 from the front opening 16 of the lure and forced through the channel 14 and driven out from the rear opening 17. The propeller is moved under the force of the water as it is pulled through the water.

The fishing lure 10 is equipped with one or more hooks 18 which may be attached to the eye-rings 19 provided on the body of the fishing lure 11 and may be selected from various styles of hooks 18. As shown, a pair of double or dual hooks 18 are positioned between the outer surface of each side of the body 11 so that the hooks may be firmly clamped to opposite sides of the body.

Figure 3A:
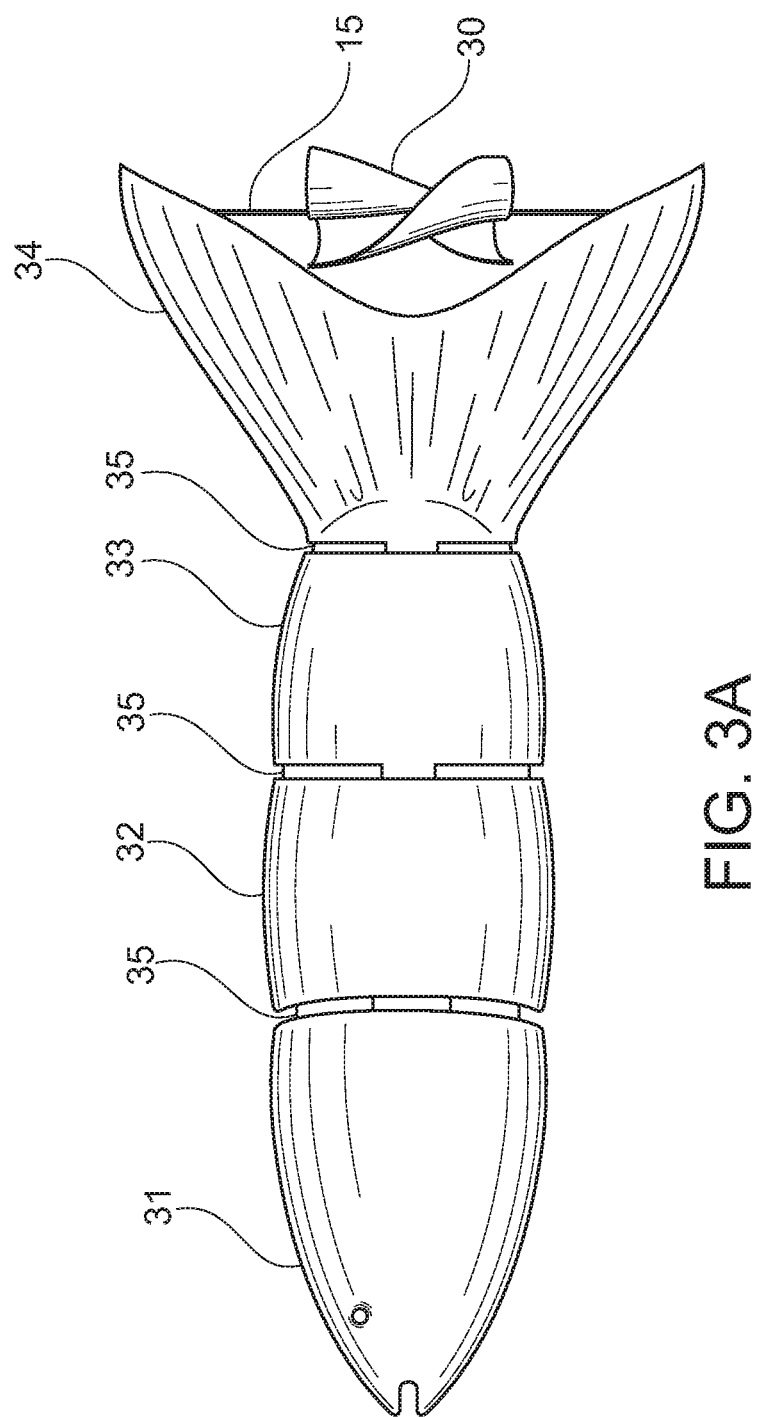
FIG. 3A is a side view of another embodiment of the present invention.
Figure 3B:
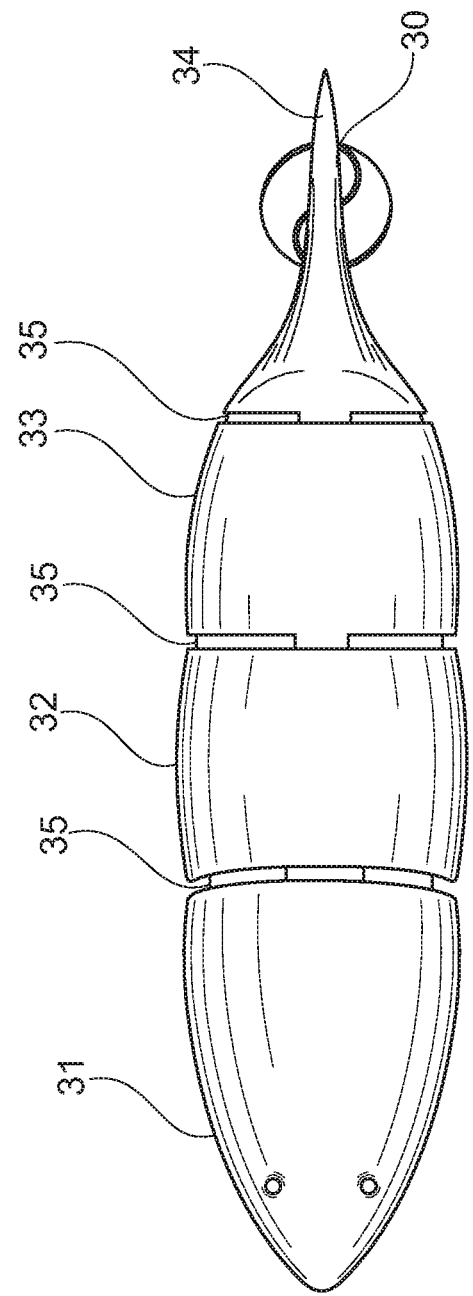
FIG. 3B is a top view of the same embodiment of the present invention according to FIG. 3A.

In another embodiment illustrated in FIGS. 3A and 3B, the fishing lure 10 is constructed from multi sectional body. The plurality of substantially structural body members is connected by pivot spacers 35. The structural body members are generally evenly spaced from one another in the longitudinal manner to define the shape of a fish. The structural members usually include a fish head 31, fish body 32,33 and a fish tail 34. The fish body can be constructed in more sections depending on the application and size of the fishing lure 10. The spacing between the body members and the sideways movements of the lure 10 is achieved using pivot spacers 35. The multi-structural body provides the fishing lure 10 swimming of the lure sideways and gives an extra vibration to the fish lure 10 in combination of the vertical axis propeller 30 vibration in the water to attract the fish.

In operation, when the fishing lure 10 is drawn through water, the body members 31, 32, 33 and the fish tail 34 undergo a side-to-side motion, thus, making the fishing lure 10 appear to be swimming. As the fishing lure 10 is drawn through water, the water develops vortices, causing an S-shaped side-to-side motion of the body members and the fish tail 34 and provide an exceedingly simple and efficient form of vibration, whereby the activities of a fish may be simulated and a zigzag motion through the water and, at the same time splashing water through vertical axis propeller 30 on the tail 34.

Figure 4A:
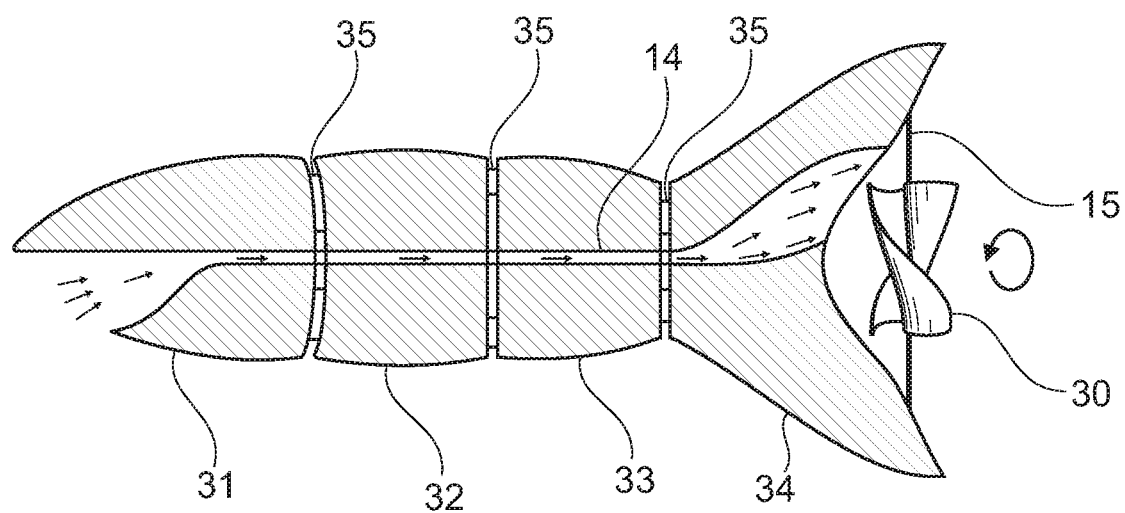
FIG. 4A is a longitudinal cross-section through the lure of another embodiment of the present invention.
Figure 4B:
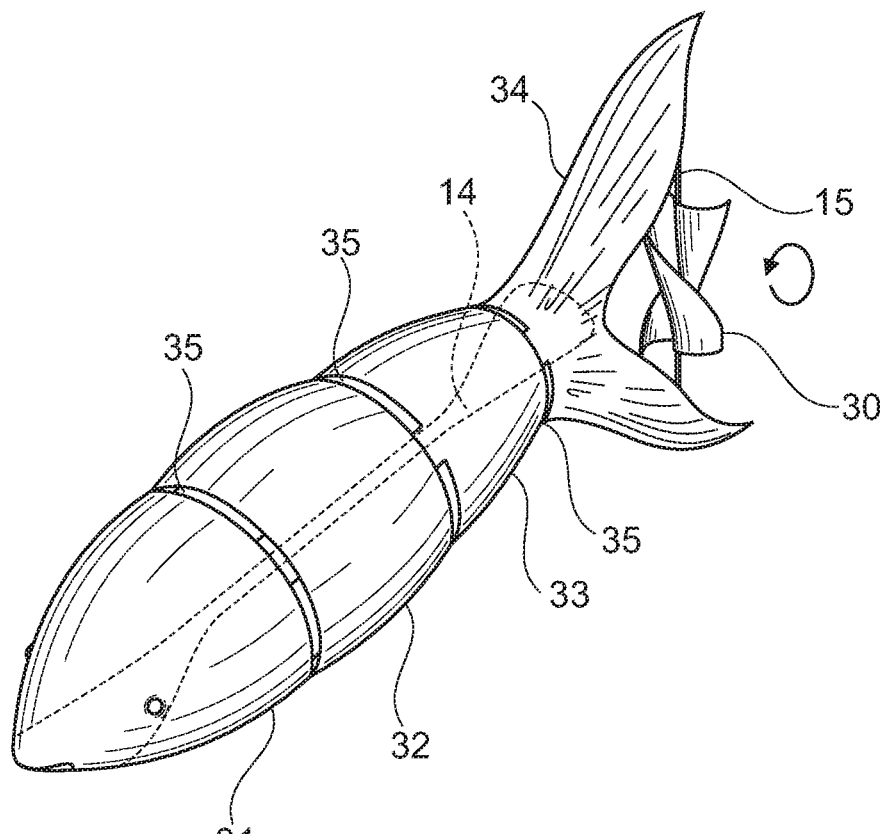
FIG. 4B is a perspective view of the same embodiment of the lure according to FIG. 4A.

Referring to FIGS. 4A and 4B the fishing lure with multi-sectional body further may be constructed with the longitudinal channel 14. The channel 14 directs water against the blades of the propeller 30. The body members 31, 32, 33 and the fish tail 34 undergo a side-to-side motion As the fishing lure 10 is drawn through water the body of the lure 11 dives to force water to flow into and through the interior channel 14 and trap water in the interior channel 14 and force the trapped water through the rear opening 17 into the propeller 30 and make the propeller 30 to rotate thereby, the water force on the propeller 30 will be not only from the sides of the propeller 30 but also directly from the rear opening 17 of the channel 14 to the blades of the propeller 30 creating in combination of the zig zag motion of the fish body a double water vibration.

Figure 5:
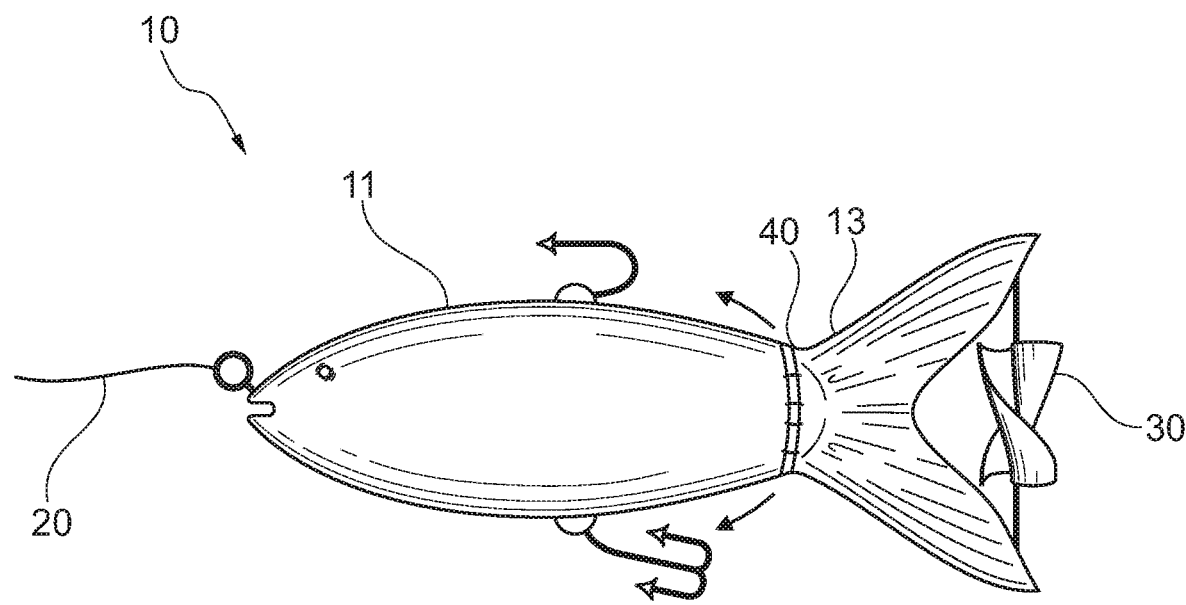
FIG. 5 is a side view of another embodiment of the present invention with hinged tail.

According to FIG. 5 the fishing lure of the present invention 10 may provide a hinge attachment 40 in connection point of the body portion of the lure 11 and the tail portion 13. The hinge attachment 40 provides a side to side pivoting movement to the tail 13. The sideways movements of the tail 13 gives an extra vibration to the fishing lure 10 in combination of the vertical axis propeller 30 vibration in the water to attract the fish.

Figure 6:
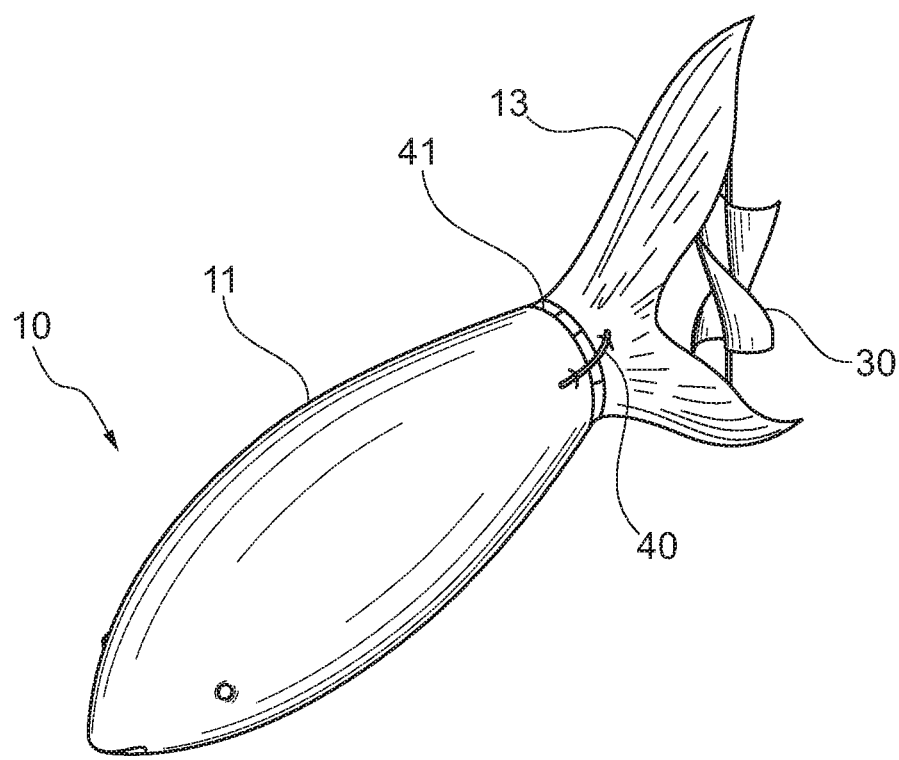
FIG. 6 is another embodiment of the present invention with double hinged tail.

Another embodiment of the fishing lure of the present invention 10 is shown in FIG. 6. The fishing lure 10 provides a second hinge attachments 41 in combination with the first hinge attachment 40 in connection point of the body portion 11 and the tail 13, the second hinge attachment 41 provides an up and down pivoting movement to the tail 13. The sideways movements of the tail 13 and the up and down movements, gives an extra vibration to the fishing lure 10 in combination of the vertical axis propeller 30 vibration in the water to attract the fish.

Figure 7:
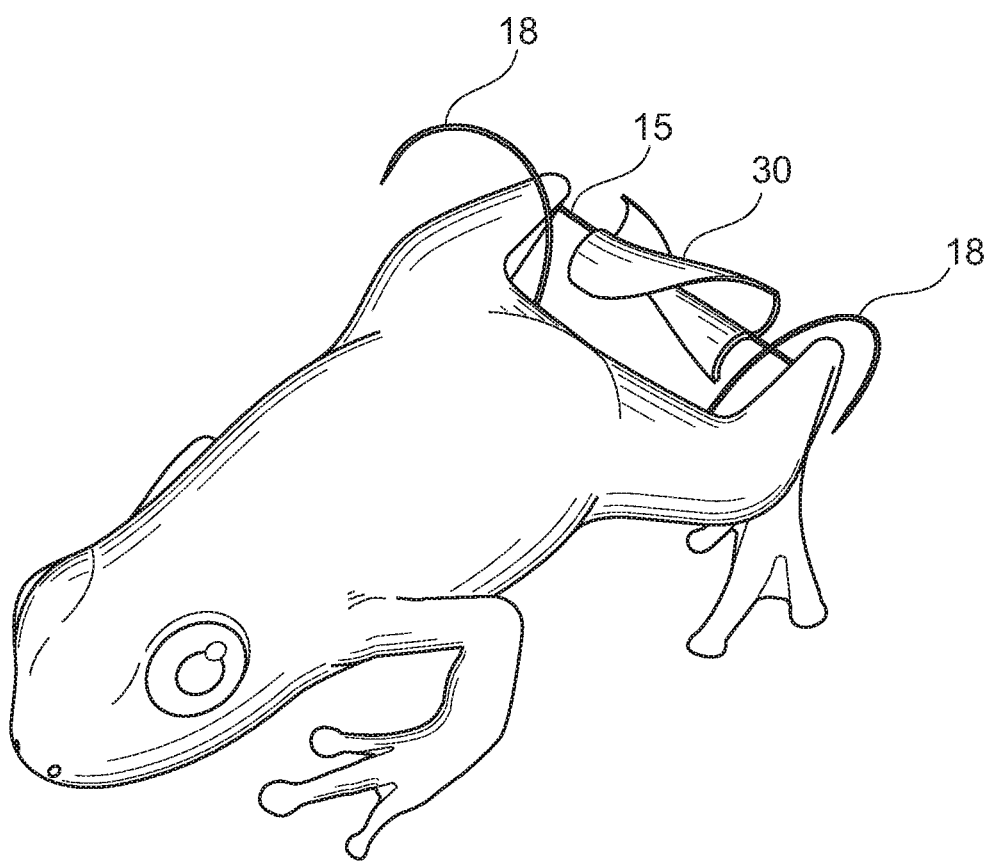
FIG. 7 is another embodiment of the present invention.

The configuration of the fishing lure 10 may be any geometric shape to attract the fishes, without departing from the disclosed inventive principles. The body of the fishing lure 11 can be in various configuration. FIG. 7 represent an artificial frog like shape. The propeller 30 is disposed in a space between the frog legs by the retaining bar 15 and rotate in an axle in a vertical manner to provide a vibration in the water as the frog is swimming.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A fishing lure comprising:
 a) a body having a head and a tail portion, wherein said tail portion comprises of a first fin and a second fin spaced from each other;
 b) a bar connected between the first fin and the second fin, defining a vertical axis, and
 c) a vertical-axis-propeller mounted on said bar to rotate about the bar and having a set of blades,
  whereby when said lure is moved through water, a water flow passing over the vertical-axis-propeller causes rotation of said set of blades on said bar, whereby a combination of a angular momentum generated by the vertical-axis-propeller and the pulling action of the lure by a user results in a zig-zag motion of the lure.

2. The fishing lure of claim 1, wherein said set of blades of the vertical axis propeller are circularly curved along a width of the blade to maximize the water capture.

3. The fishing lure of claim 1, further having an elongated longitudinally disposed channel extending from the head to tail portions of said lure through said body, and having a front opening and a rear opening for directing the water flow against said vertical-axis-propeller, whereby, the water flow enters into said channel from said front opening of said lure and is forced through said channel and exits from said rear opening, causing said vertical axis propeller to rotate causing significant disturbance in a mass water.

4. The fishing lure of claim 3, wherein the front opening of said elongated longitudinally disposed channel is a conical shape opening to maximize water capture as the lure is moved through water.

5. The fishing lure of claim 3, wherein the rear opening of said elongated longitudinally disposed channel is a vertically oriented rectangular shape opening to orient the water flow from the rear opening along the vertical-axis-propeller and to maximize a water speed as it is ejected from the rear opening.

6. The fishing lure of claim 3, wherein the elongated longitudinally disposed channel is designed to smoothly convert a conical front opening to a vertically oriented rectangular shape rear opening.

7. The fishing lure of claim 3, wherein the elongated longitudinally disposed channel is designed to smoothly convert a conical front opening to a vertically oriented rectangular shape rear opening that is off of the vertical axis of said bar, whereby the water flow is directed towards one side of said set of blades.

8. The fishing lure of claim 1, wherein said fishing lure comprising of a multi sectional body members comprising:
 d) a head portion, a body portion and a tail portion, and e) said multi-sectional body members are spaced from one another and longitudinally connected by pivot spacers, whereby said multi-structural body provides said fish lure swimming on sideways and gives an extra oscillation to said fish lure in combination of said vertical axis propeller.

9. The fishing lure of claim 1, further having a line attaching eye secured in the head portion.

10. The fishing lure of claim 1, further having a plurality of depending hooks secured to said body of said fishing lure.

11. A fishing lure comprising of a multi-sectional body comprising:
   a) a head portion, a body portion and a tail portion; wherein different
   b) portion of said multi-sectional body is spaced a next portion and is longitudinally connected by pivot spacers; said tail portion comprises of a first fin and a second fin spaced from each other and connected by a bar;
   c) a vertical-axis-propeller mounted on said bar to rotate about a vertical axis; said vertical-axis-propeller comprising of a set of blades that rotate by a passage of a water flow generated by moving said lure through water;
   d) an elongated longitudinally disposed channel extending from the head to tail portions of said lure through said body, and having
      i) a front opening, wherein said front opening has a conical shape to maximize water capture as the lure is moved through the water, and
      ii) a rear opening, wherein said rear opening has a rectangular shape to orient the water flow along the vertical-axis propeller and to maximize the water speed as it is ejected from the rear opening;
   e) a line attaching eye secured on the head portion, and
   f) a plurality of depending hooks secured onto said body of said fishing lure, whereby said multi-structural body allows a lateral vibration of said fish lure.

* * * * *